UNITED STATES PATENT OFFICE.

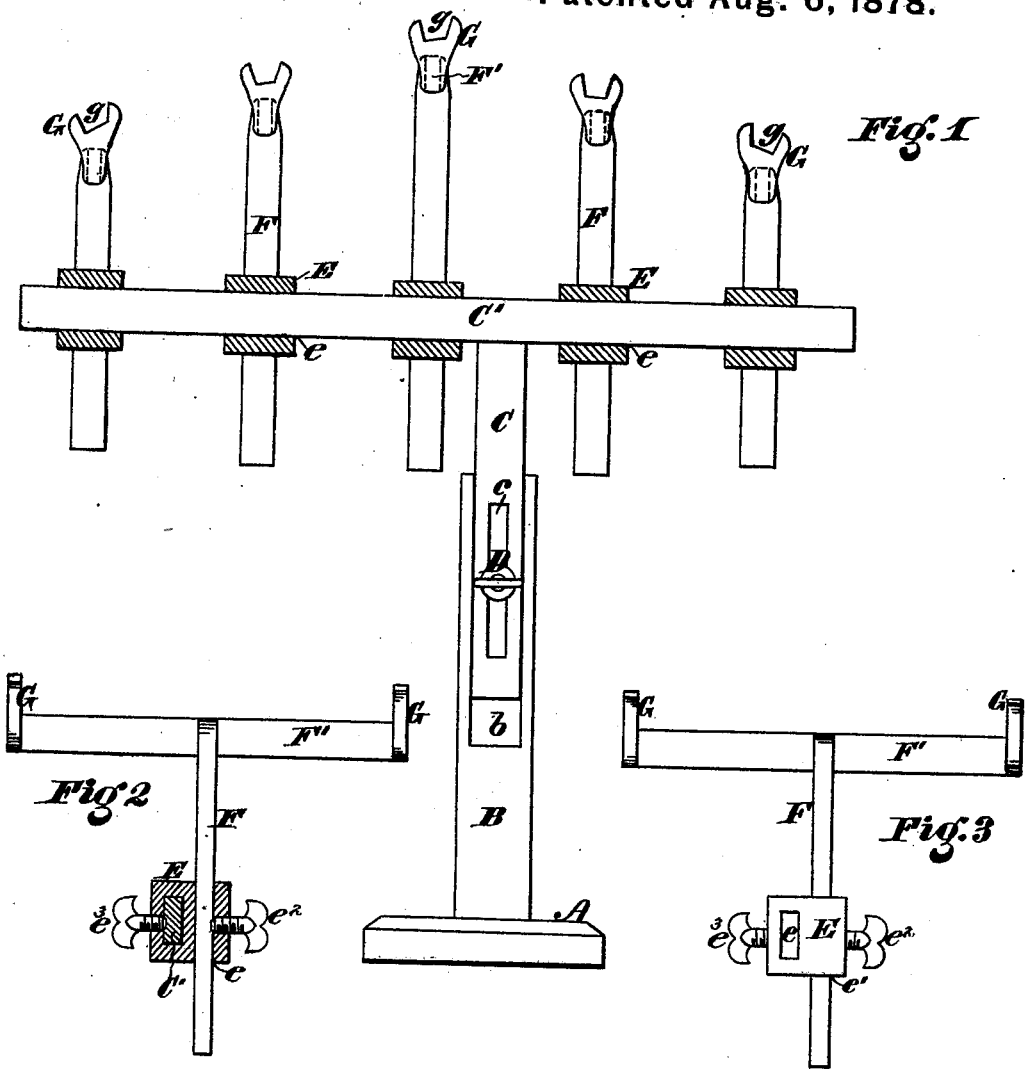

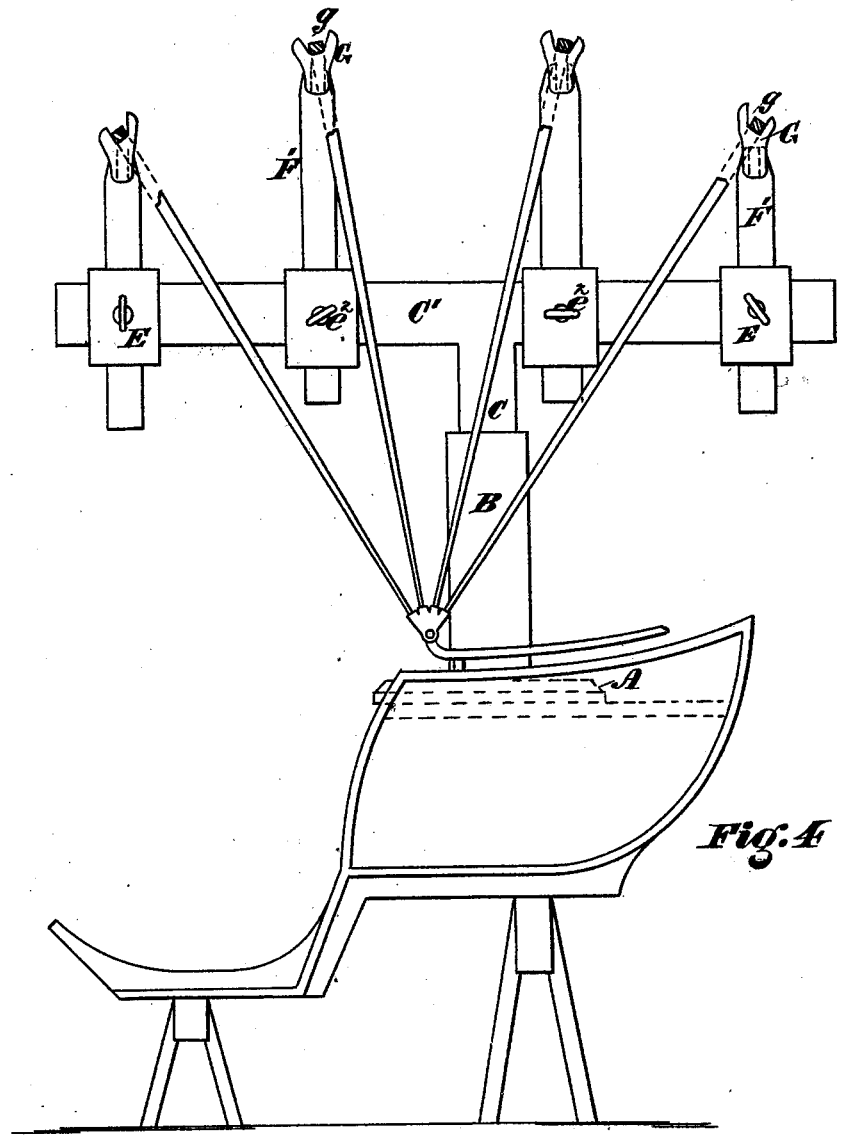

WILLIAM B. MAXWELL, OF PHILADELPHIA, PENNSYLVANIA.

IMPROVEMENT IN CARRIAGE-BOW SETTERS.

Specification forming part of Letters Patent No. 206,808, dated August 6, 1878; application filed April 24, 1878.

*To all whom it may concern:*

Be it known that I, WILLIAM B. MAXWELL, of Philadelphia, in the county of Philadelphia and State of Pennsylvania, have invented a certain new and useful Former for Setting the Bows of Falling-Top Buggies; and I do hereby declare the following to be a full, clear, and exact description of the invention, such as will enable others skilled in the art to which it pertains to make and use it, reference being had to the accompanying drawings, which form part of this specification, in which—

Figure 1 is a vertical longitudinal section. Fig. 2 is a transverse vertical section. Fig. 3 is an end elevation.

My invention has for its object to provide a device or apparatus by means of which the bows of falling-top buggies and other vehicles may be formed or set at their respective distances, altitudes, and angles with reference to each other, said device or apparatus to be adjustable to adapt it for varying numbers of bows and different styles of tops.

My improvements consist in the peculiar construction, combination, and arrangement of parts hereinafter fully described.

Referring to the accompanying drawing, A represents a pedestal, from which rises a column, B, one side of which is grooved, as shown at $b$. C represents an upright of such width as to fit snugly in the groove $b$ with sufficient freedom to be easily moved up and down therein when required, as hereinafter set forth. Said upright is slotted at $c$, a set-screw, D, entering through said slot to the column B, whereby said upright is rendered vertically adjustable on said column. C' is a horizontal bar firmly secured on the upright C, these two parts thus forming a T-standard. E E are blocks mortised at $e$ for the entrance of the bar C', and at $e^1$ for the reception of uprights F F, set-screws $e^2$ $e^3$ passing through said blocks to meet said bar and uprights and render the parts relatively adjustable. The uprights F have cross-bars F', on either end of which are ears G, notched at $g$.

The operation is substantially as follows: The pedestal is placed upon the seat of the buggy to which a top is to be applied. The upright C is then adjusted on the column B, the blocks E on the bar C', and the uprights F in said blocks according to the distances, &c., which it is supposed will be required. The bows requiring to be formed are then set in the notches $g$ of the ears G, the lower extremities of said bows being brought together. If the adjustment first made be correct, the bows are then secured by tacked strips or otherwise, and removed for trimming. If the adjustment first made be not correct, it can be readily amended to suit by moving the upright C on the column B, the blocks E on the bar C', and the uprights F in said blocks E.

Where it is required to form an extension-top, if the arm C' be not long enough, it may be lengthened by the addition of a continuation fastened by any appropriate means.

The number of blocks E and uprights F may be varied according to the requirements of the case, and I do not limit myself to any special number. So, too, while means of adjustment are desirable, so as to render the device applicable to a variety of shapes of buggy-tops, my invention is not limited to such adjustment features, as, where but a single shape is being extensively manufactured, it might be prudent to employ a former rigidly set at the proper distances, &c., in which case the column B and upright C might be in one piece, and the uprights F secured directly to the bar C' without the intervention of the blocks E—a construction which would be included by the principle of my invention.

I am aware that a buggy-top former having a central adjustable standard and loops adapted to receive the bows, said loops being adjustable on the bar to which they are secured, is already known. This construction I do not therefore wish to be understood as claiming; but

What I claim as my invention is—

1. The uprights F, having cross-bars F', with notched ears or ends G, substantially as shown and described.

2. The former for tops of buggies, &c., herein shown and described, consisting of pedestal A, column B, adjustable upright C, horizontal bar C', mortised blocks E, and adjustable uprights F, having cross-bars F' and forked or notched ears G, substantially as set forth.

In testimony that I claim the foregoing I have hereunto set my hand this 15th day of April, 1878.

WILLIAM B. MAXWELL.

Witnesses:
M. D. CONNOLLY,
CHAS. F. VAN HORN.